July 9, 1957  G. E. HOWARD  2,798,911
SPEED INDICATOR FOR MOTOR VEHICLES
Filed Dec. 20, 1954  2 Sheets-Sheet 1
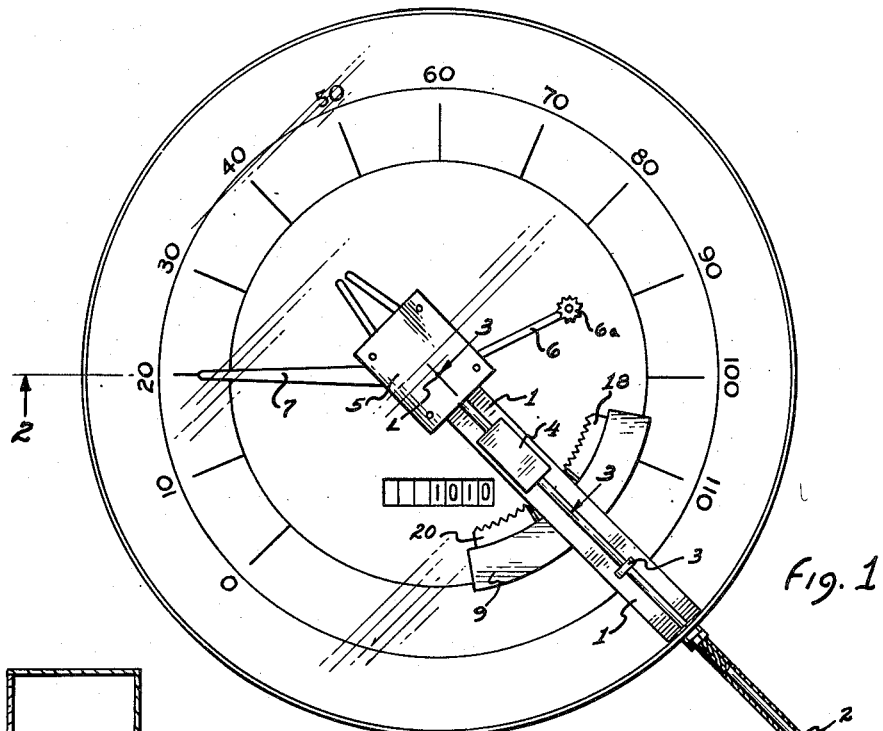
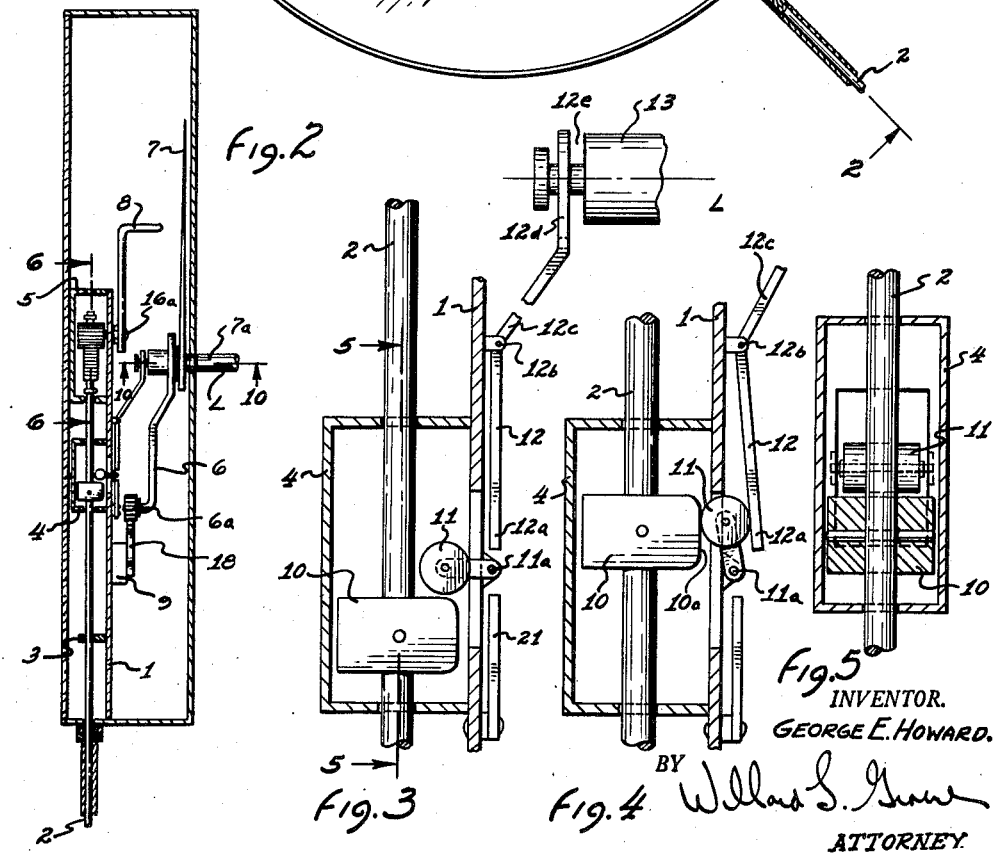
INVENTOR.
GEORGE E. HOWARD.
BY Willard S. Grove
ATTORNEY July 9, 1957  G. E. HOWARD  2,798,911
SPEED INDICATOR FOR MOTOR VEHICLES
Filed Dec. 20, 1954  2 Sheets-Sheet 2

INVENTOR.
GEORGE E. HOWARD.
BY
ATTORNEY.

ପ୍‍2,798,911
Patented July 9, 1957

2,798,911

SPEED INDICATOR FOR MOTOR VEHICLES

George E. Howard, Phoenix, Ariz.; The Valley National Bank of Phoenix, administrator of said George E. Howard, deceased Application December 20, 1954, Serial No. 476,501

2 Claims. (Cl. 200—56)

This invention pertains to improvements in speed indicating devices for motor vehicles and is particularly directed to an improved speed indicator for motor vehicles which may be pre-set for different speed zones to automatically indicate whether the driver, operating in that particular speed zone, is traveling at a rate below, at, or above the selected speed zone through which he is passing.

One of the objects of this invention is to provide a speed indicator warning device for the driver of a motor vehicle to show whether he is traveling above or below or at a particular speed range.

Still another object of this invention is to provide an improved speed indicator for motor vehicles which may be automatically pre-set for each particular speed zone through which he is traveling while giving a warning signal to indicate whether or not the driver is operating the vehicle above, at, or below the particular speed zone selected.

Still another object of this invention is to provide an improved speed indicator for motor vehicles which may be pre-set by the foot of the driver by manipulating a suitable control so as to pre-set the warning device for the particular speed zone range through which the driver is traveling.

Still another object of this invention is to provide an improved speed indicator for motor vehicles which may be preselected for any particular speed of the vehicle by reducing or increasing the speed of the vehicle to the desired speed zone rate and then depressing momentarily a foot control to automatically thereby set the indicator device for indicating whether the driver is traveling above, at, or below the particular speed zone selected.

Further features and advantages of this invention will appear from a detailed description of the drawings in which:

Fig. 1 is a front view of the speed indicator incorporating the features of this invention.

Fig. 2 is a section on the line 2—2 of Fig. 1.

Fig. 3 is an enlarged section on the line 3—3 of Fig. 1.

Fig. 4 is a fragmentary enlarged section similar to the section 3—3 but showing the result of actuating the device for pre-selection.

Fig. 5 is an enlarged fragmentary section on the line 5—5 of Fig. 3.

The warning or indicating device itself may take the form of a miniature traffic signal light placed horizontally from left to right with a green light G, an amber light A, and a red light R, Fig. 9, placed in a conspicuous place for the driver of the vehicle such as slightly to the left of the rear view mirror and just below the top of the windshield. In this position it would be within the range of vision of the driver as he watches the road ahead. The indicator is controlled so as to show, by green, amber, and red lights, respectively whether the vehicle is being driven below, at, or above a pre-set rate of speed.

Figure 11:
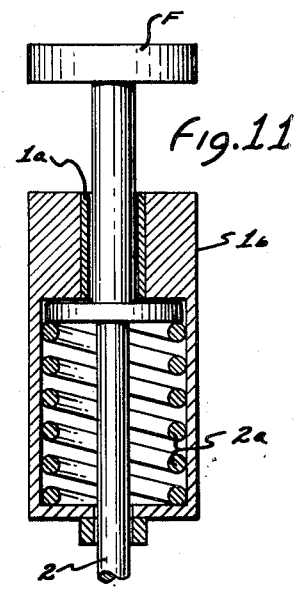
Fig. 11 is an enlarged section through the foot control button of the device.

At any time while the vehicle is in motion, the rate of speed at which the indicating device will operate may be set or changed by depressing and releasing a foot button F, Fig. 11, appropriately set in the floor within reach of the driver's foot in a similar manner to the conventional headlight dimmer switch arrangement.

As an example of the operation of this device, when a 60 mile per hour speed zone is entered and a speed of 60 miles per hour is attained, the driver may momentarily step on the foot button which sets the indicating device to operate at a 60 mile per hour speed. Thereafter, and until the foot button is again depressed when the vehicle is being driven between 45 and 54 miles per hour the indicator will show a green light; when the vehicle is being driven between 55 and 60 miles per hour the indicator will show an amber light; and when the vehicle is being driven between 61 and 70 miles per hour the indicator will show a red light. When another speed zone is entered, the driver may reset the device by stepping on the foot button as the vehicle is being driven at the prescribed rate of speed for that zone.

The device may be used and incorporated as part of a conventional type speedometer and requires no change in the operating construction and functioning of the speedometer.

Figure 10:
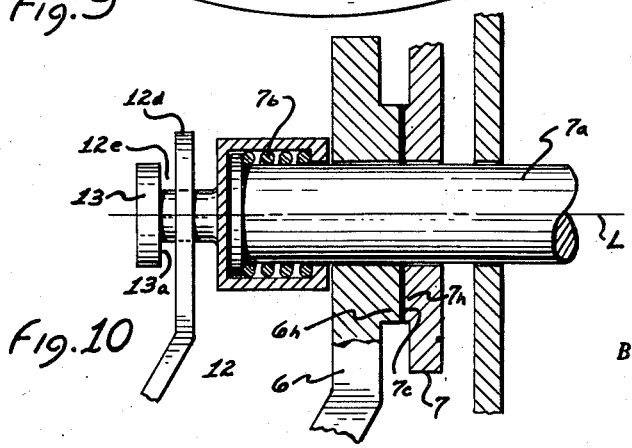
Fig. 10 is an enlarged section on the line 10—10 of Fig. 2.

This device accomplishes the results above outlined as follows: When the foot button F, Fig. 11, slidably mounted in the guide support bushing 1–a carried in the casing 1–b suitably secured to the vehicle chassis, is depressed, the actuating cable or push wire 2 raises the bumper 10 fixed to it, Fig. 3, to actuate a suitable swivel roller 11 pivotally mounted on a suitable pin 11–a on the frame or casing 1 of the speedometer to cause the roller 11 to swing outwardly, Fig. 4, against the lower end 12–a of the releasing lever 12, the releasing lever being suitably pivotally mounted at 12–b on the frame 1 of the speedometer. The upper portion 12–c terminates in a forked end 12–d which fits around the annular groove 12–e of the spring loaded cap 13, Fig. 10, slidably mounted on the speedometer pointer shaft 7–a having the usual pointer 7. A compression spring 7–b normally urges the cap 13 (to the right in Fig. 10) so as to hold the contact arm 6 in frictional contact with the face 7–c of the speedometer pointer. When the lower end 12–a of the releasing lever 12 is swung outwardly, its upper end 12–d will pull the cap 13 outwardly slightly to the left, Fig. 10, releasing the pressure of spring 7–b from holding the contact arm 6 in contact with the speedometer pointer 7 thus freeing the contact arm 6 so that it can be moved independently of the speedometer pointer 7. Releasing lever 12 is held in this position by the surface 10–a of the bumper 10 as the cable 2 continues its upward movement, thus holding contact arm 6 free.

Figure 6:
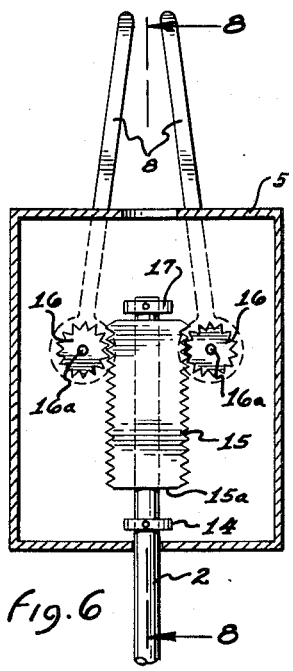
Fig. 6 is an enlarged section on the line 6—6 of Figs. 2 and 8.
Figure 8:
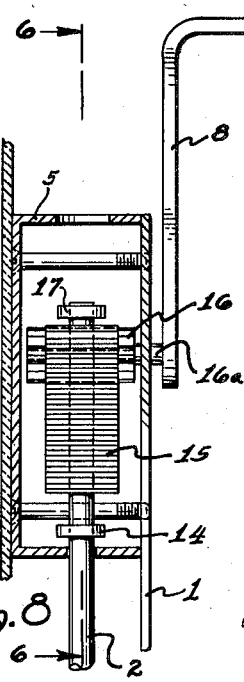
Fig. 8 is an enlarged section on the line 8—8 of Fig. 6 showing the device at the time of pre-setting of the indicator.

Slidably mounted in the housing 5 on the outer end of the push cable 2 is the double faced rack 15 each side of which engages the pinions 16 pivotally mounted on suitable shafts 16–a journaled in speedometer frame 1 and to the outer ends 16–a are fixed the positioning levers 8. Up to the point when contact arm 6 is released as described, cable 2, Fig. 6, slides through rack 15. As contact arm 6 is released, bumper 14 which is firmly attached to the cable, makes contact with the lower end 15–a of the rack 15 forcing the rack upward between the pinions 16. As pinions 16 turn, positioning levers 8 move outward and downward in a circular sweep until they come to the end of their movement, Fig. 7, and center up directly above the upper or left hand edge of a middle contact segment 19, Fig. 9. Since the tip of one of the positioning levers 8 has caught contact arm 6 in its sweep, Figs. 6 and 7, the contact arm 6 is now held in position so that its pinion 6–a makes contact with the upper edge, or left hand edge, of segment 19 and the amber light A shows in the indicator.

At the point when contact arm 6 has been placed in position by positioning levers 8 as described above, bumper 10, Fig. 3, has reached the top of its travel and allows room for swivel roller 11 to be forced inward by the portion 12–a of the releasing lever 12 until swivel roller 11 is below bumper 10. This releases the pressure against the flange 13–a of the cap 13, Fig. 10, and allows cap 13 under the influence of compression spring 7–b to press the hub 6–a of contact arm 6 against the hub 7–h of the speedometer pointer 7 so that both will move as a unit.

Figure 7:
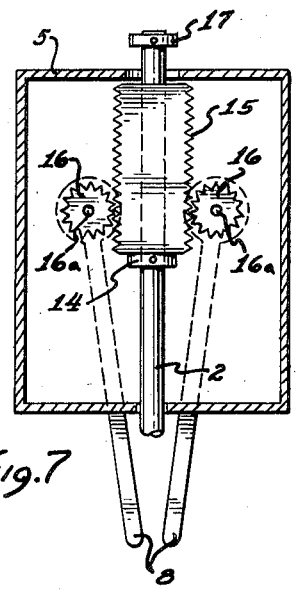
Fig. 7 is an enlarged section similar to Fig. 6 showing the arms rotated 180°.

As the foot is removed from the foot button and the cable 2 under the influence of the compression return spring 2–a, Fig. 11, bumper 10 moves downward, forcing swivel roller 11 outward against spring 21. When bumper 10 has completed its travel to its lowest position, swivel roller 11 is forced above bumper 10 by the flat spring 21 to the position shown in Fig. 3. At the same time rack 15, Fig. 7, is pulled downward by the bumper 17 fixed to the end of cable 2, turning pinions 16, and returning positioning levers 8 outward and upward to their original position, Fig. 6.

Figure 9:
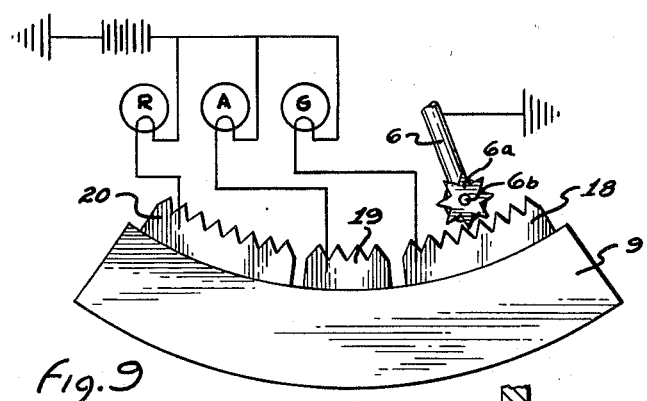
Fig. 9 is an electric circuit diagram of the apparatus.

Referring to Fig. 9, mounted on a suitable insulative support is the lower or right hand contact segment 18, which completes the circuit to the green light, is equal in length to 9 miles per hour speedometer pointer travel. Contact segment 19, the middle contact, which completes the circuit to the amber light, is equal in length to 5 miles per hour speedometer pointer travel. Contact segment 20 connected to the red light is equal to 9 miles per hour speedometer pointer travel. The contact arm 6 with its freely rotating pinion 6–a on the pin 6–b is preferably of light weight and balanced with its center of gravity at the center line L of the speedometer shaft and meshing of pinion 6–a with contact segments should be only deep enough to maintain electrical contact without binding so that the only resistance to free travel of the speedometer pointer should be that necessary to turn the pinion 6–a on the pin 6–b. It is understood that other types of contact mechanism may be substituted if desired.

While the apparatus herein disclosed and described constitutes a preferred form of the invention, it is also to be understood that the apparatus is capable of mechanical alteration without departing from the spirit of the invention and that such mechanical arrangement and commerical adaptation as fall within the scope of the appendent claims are intended to be included herein.

Having thus fully set forth and described this invention what is claimed and desired to be obtained by United States Letters Patent is:

1. A control switch, a speedometer, and a pointer in said speedometer, said control switch comprising a series of three arcuate contact segments, arranged in said speedometer about the axis of movement of said speedometer pointer, a contact arm, having a contact pinion electrically engaging mating teeth on said segments, pivotally mounted on said axis of movement of said pointer, a friction clutch including means to yieldingly hold said contact arm in driven engagement with said pointer, foot-operated means for releasing said friction clutch, and means actuated by said foot-operated means when said friction clutch is released to automatically pre-set said contact arm in a predetermined position relative to said segments.

2. A control switch, a speedometer, and a pointer in said speedometer, said control switch comprising a series of three arcuate contact segments arranged in said speedometer about the axis of movement of said speedometer pointer, a contact arm, having a contact pinion electrically engaging mating teeth on said segments, pivotally mounted on said axis of movement of said pointer, a friction clutch including means to yieldingly hold said contact arm in driven engagement with said pointer, foot-operated means for releasing said friction clutch comprising a foot button, spring return means for said button, a push cable connected to said button, a bumper fixed on said cable, a roller pivotally mounted on said speedometer and actuable by the push movement of said cable to initially release said clutch, a positioning device having a pair of oppositely swung positioning levers actuable by the further push movement of said cable after said clutch is released to position said contact arm in electrical contact with one of said segments, and means in said cable for returning said positioning levers to retracted position and said roller to released position when said foot button is released.

References Cited in the file of this patent

UNITED STATES PATENTS

| | | |
|---|---|---|
| 1,634,069 | Cordray | June 28, 1927 |
| 1,860,972 | Wulfhorst | May 31, 1932 |
| 2,239,328 | Kolb | Apr. 22, 1941 |
| 2,246,047 | Jackson | June 17, 1941 |
| 2,433,895 | Fairhurst | Jan. 6, 1948 |
| 2,484,038 | Kirlin | Oct. 11, 1949 |